(12) United States Patent
Surma

(10) Patent No.: US 6,576,210 B2
(45) Date of Patent: Jun. 10, 2003

(54) METHOD FOR COMPLETE DESTRUCTION OF CARBON IN HIGH TEMPERATURE PLASMA WASTE TREATMENT SYSTEMS

(75) Inventor: Jeffrey E. Surma, Richland, WA (US)

(73) Assignee: Integrated Environmental Technologies, LLC, Richland, WA (US)

( * ) Notice: Subject to any disclaimer, the term of this patent is extended or adjusted under 35 U.S.C. 154(b) by 0 days.

(21) Appl. No.: 09/935,485

(22) Filed: Aug. 22, 2001

(65) Prior Publication Data

US 2002/0001557 A1 Jan. 3, 2002

Related U.S. Application Data

(63) Continuation-in-part of application No. 09/575,485, filed on May 19, 2000, now abandoned.

(51) Int. Cl.⁷ .............................................. C01B 31/02
(52) U.S. Cl. ........................... 423/445 R; 423/DIG. 10
(58) Field of Search ........................... 423/418.2, 640.1, 423/445 R, DIG. 10; 252/373

(56) References Cited

U.S. PATENT DOCUMENTS

| | | | | | |
|---|---|---|---|---|---|
| 3,642,608 | A | * | 2/1972 | Roach et al. | 208/8 |
| 4,190,636 | A | * | 2/1980 | Schmerling et al. | 423/415 A |
| 5,547,653 | A | * | 8/1996 | Webster et al. | 423/445 R |
| 6,187,226 | B1 | * | 2/2001 | Detering et al. | 252/373 |

* cited by examiner

*Primary Examiner*—Stanley S. Silverman
*Assistant Examiner*—Edward M. Johnson
(74) *Attorney, Agent, or Firm*—Douglas E. McKinley, Jr.

(57) ABSTRACT

A method for destroying carbon carryover created in high temperature plasma waste treatment systems whereby the carbon carryover is mixed with a wetting agent and returned to the high temperature plasma waste treatment system for further processing. The method may further utilize the carbon carryover to first capture the hydrocarbons produced in a high temperature plasma waste treatment system, and then feed the thus captured hydrocarbons back into the high temperature processing system to be converted into useful products together with the carbon carryover.

2 Claims, 1 Drawing Sheet

METHOD FOR COMPLETE DESTRUCTION OF CARBON IN HIGH TEMPERATURE PLASMA WASTE TREATMENT SYSTEMS

RELATED APPLICATION

This is a Continuation-in-Part of U.S. patent application Ser. No. 09/575,485, filed May 19, 2000, "SIMULTANEOUS DESTRUCTION OF CARBON AND HYDROCARBON CARRYOVER," now abandoned.

FIELD OF THE INVENTION

The present invention relates generally to a method for destroying carbon carryover created in high temperature plasma waste treatment systems. More specifically, the present invention relates to a method for capturing carbon carryover produced in a high temperature plasma waste treatment system in a slurry, and directing the slurry back into the high temperature plasma waste treatment system to convert the carbon into a synthesis gas.

BACKGROUND OF THE INVENTION

A variety of schemes exist for the treatment, or conversion, of organic materials into useful gasses such as carbon monoxide and hydrogen. In certain plasma waste treatment systems, a high electrical potential is generated across a pair of electrodes, or a single electrode and the organic material, to create an ionized gas, or a plasma. A plasma generated in this manner will exhibit high temperatures, ranging from approximately 3,500 C. to over 10,000 C. Heat from the plasma is then radiated to the surrounding organic materials. In these arrangements, organic compounds are destroyed by pyrolysis, wherein the high temperatures of the plasma break the chemical bonds of the organic molecules. Oxygen contained within the waste materials is often augmented by the introduction of a supplemental oxygen source, such as steam, into process chamber, and these pyrolyzed organic constituents are then converted into a clean burning synthesis gas consisting primarily of CO, $CO_2$ and $H_2$. An example of a plasma system of this type is shown In U.S. Pat. No. 5,666,891, titled "Arc Plasma-Melter Electro Conversion System for Waste Treatment and Resource Recovery" to Titus et al. the entire contents of which are incorporated herein by reference.

Unfortunately, it is often the case that a portion of the organic materials will not experience complete conversion into this desirable synthesis gas. Instead, a portion of the organic materials will be converted into carbon in a particulate form (hereinafter carbon carryover) and various other hydrocarbons. As used herein, these other various hydrocarbons include, but are not limited to, polyaromatic hydrocarbons (PAHs), polychlorinated dibenzodioxins (PCDDs), polychlorinated dibenzofurans (PCDFs), polychlorinated biphenyls (PCBs), volatile organic compounds such as benzene, dichlorobenzene, and toluene, and reformed products made from the foregoing.

Known methods for disposing of carbon carryover, hydrocarbons and reformed hydrocarbon products created by high temperature plasma waste treatment systems have proven to be both labor intensive and expensive. Typically, these materials must be separated from the desirable synthesis gas, and then disposed of. The operations required to separate carbon carryover and hydrocarbons can often add significant expense to the overall cost of operating these high temperature plasma waste treatment systems. Requirements for physical handling of these materials can also create safety concerns, as workers may require special protective clothing and equipment to prevent exposure to potentially harmful effects.

Carbon carryover is also typically produced in a form that is difficult to handle with automated equipment. Dry carbon carryover has a tendency to clog conventional equipment designed to transport materials, such as auger feeders. In the parent application, U.S. patent application Ser. No. 09/575, 485, filed May 19, 2000, "SIMULTANEOUS DESTRUCTION OF CARBON AND HYDROCARBON CARRYOVER" now abandoned, one solution to the problems these materials create was introduced with the concept of reintroducing carbon carryover back into the processing chamber of a high temperature plasma waste treatment system to effect the complete conversion of the carbon carryover into synthesis gas. However, carbon carryover in a dry form has been shown to resist efficient processing in high temperature plasma waste treatment systems. Dry carbon carryover introduced directly into the process chamber has a tendency to billow, thus causing the particles to become entrained in the exhaust gas and escape the processing chamber before the required reactions takes place that would convert the carbon carryover into synthesis gas.

These and other drawbacks of the prior art have created a need for an improved methods for separating the carbon carryover and hydrocarbons from the synthesis gas streams produced in high temperature plasma waste processing systems, and converting them to useful products such as synthesis gas once they are separated.

SUMMARY OF THE INVENTION

Accordingly, the present invention is a method for separating carbon carryover and hydrocarbons from the gas streams produced in high temperature plasma waste processing systems, and converting them to useful products such as synthesis gas once they are separated. In one aspect of the present invention, the carbon carryover is removed from the gas stream and is then mixed with a wetting agent to form a slurry. The slurry is then reintroduced back into the high temperature plasma waste processing system to allow further processing, and eventually the destruction of the carbon, preferably through a partial oxidation and steam reforming reactions, thereby producing a synthesis gas consisting mainly of carbon monoxide and hydrogen. By mixing the carbon carryover as a slurry, the carbon carryover may be held more effectively in the plasma heating zone, thereby promoting the desired reactions more effectively than is typically accomplished with dry particulate.

As practiced by the present invention, the carbon is first mixed with an appropriate wetting agent to transform the carbon carryover into a good slurry that may be readily handled with automated equipment. As used herein, a "good slurry" is one in which a minimal amount of the carbon carryover is phase separated with the wetting agent. Typically, this type of phase separation is observed as carbon floating on the surface of the wetting agent.

Several considerations are simultaneously relevant in the selection of an appropriate wetting agent. First, an appropriate wetting agent preferably contains oxygen to assist in the partial oxidation reaction with the carbon carryover. Second, to improve the overall operating cost of the high temperature plasma waste processing system, it is preferred that the wetting agent be inexpensive and readily available. Finally, an appropriate wetting agent should wet the carbon carryover to allow it to be readily and inexpensively handled with automated equipment, for example, with pumps, and to prevent the carbon carryover from billowing within the processing chamber of the high temperature plasma waste treatment system.

Preferably, while not meant to be limiting, the wetting agent is a mixture of a short chain alcohol, such as methanol, and water. Other good wetting agents, either as a mixture with water or alone, include, but are not limited to, ethyl alcohol, propyl alcohol, butyl alcohol, pentyl alcohol, hexyl alcohol, heptyl alcohol, octyl alcohol, decyl alcohol, dodecyl alcohol, formic acid, acetic acid, propionic acid, butyric acid, valeric acid, caproic acid, caprylic acid, capric acid, linoleic acid, linolienic acid, and combinations thereof. In general, any oxygenated organic liquids, including but not limited to aldehydes, carboxylates, carboxylic acids, and long chain alcohols, either as a mixture with water or alone, may also be used as the wetting agent. The present invention should be broadly construed to include any such wetting agent that, when mixed with the carbon carryover, will form a slurry with the carbon carryover. Also, while it is preferred to have water as a component of the wetting agent, or as an additive after mixing the wetting agent and the carbon carryover, it is possible (although typically more expensive) to slurry the carbon carryover without the presence of water. The use of wetting agents with no water present should therefore be construed as included within the scope of the present invention.

Some wetting agents will be less effective in wetting the carbon carryover if they are pre-mixed with water, due to properties such as their miscibility. Thus, in preparing those slurries, it may be advantageous to mix the carbon carryover with the wetting agent prior to adding water. Surprisingly, it has been discovered that when utilizing the preferred methanol/water mixture, no sequential mixing is required, and a premixed methanol/water blend will form a good slurry with the carbon carryover. This combination thus provides the additional benefit of achieving a good slurry without the need to sequentially add the wetting agent and then the water. Blends of water and wetting agents such as methanol that will form a good slurry should thus be construed to also constitute "wetting agents" as that term is used herein.

Since water is typically cheaper than the various wetting agents utilized in the present invention, and since water contains no additional carbon species that compete with the carbon carryover for oxidants, it is preferred that the maximum amount of water be used with the wetting agent that will still allow the formation of a good slurry. Preferably, when utilizing a methanol/water blend as the wetting agent, the blend is about $\frac{1}{3}$ methanol and $\frac{2}{3}$ water by volume. There is one caveat to this general preference, however. In the case of wetting agents which have an excess of oxygen to carbon, by way of example and not meant to be limiting, formic acid, it may be the case that no water is preferred. If these wetting agents can be obtained for a low enough cost, the additional energy value of the synthesis gas generated through the use of such wetting agents may exceed the cost the wetting agent, after taking into account the energy costs of volatilizing the wetting agent as compared with water.

A separate aspect of the present invention is accomplished by turning a disadvantage of prior art systems, the presence of carbon carryover, into an advantage, by using the carbon carryover to adsorb hydrocarbons also present in the gas stream. This is accomplished by placing a filter in the path of the gas stream exiting a high temperature processing system to adsorb, and thereby trap, the hydrocarbons, while allowing the hydrogen and carbon monoxide to pass.

Accordingly, this aspect of the method of the present invention performs the steps of first exposing an organic material to a high temperature treatment process, thereby converting the organic material into a gaseous effluent containing carbon monoxide, hydrogen, hydrocarbons, and carbon particles, directing the gaseous effluent through a filter, thereby adhering the carbon particles on the filter, adsorbing the hydrocarbons onto the carbon particles. The carbon particles with adsorbed hydrocarbons are then removed from the filter; whereupon they are mixed with a wetting agent according to the first aspect of the present invention, and fed back into the high temperature plasma waste treatment system to convert them into synthesis gas. As noted above, once the slurry is formed with the carbon carryover and the wetting agent, water or additional water may also be added to provide additional oxidant for the synthesis gas forming reactions. Additionally, while not meant to be limiting, an oxidant, such as steam, air, or oxygen gas, may also be added within the process chamber itself along with the slurry to provide the necessary oxygen for complete conversion of the slurry into synthesis gas.

When operated properly, a high temperature plasma waste treatment system will typically convert a large fraction of the organic feed into carbon monoxide and hydrogen. For example, with certain organic feedstocks, high temperature plasma waste treatment systems have been shown to achieve 95–98% conversion of the organic feedstock into carbon monoxide and hydrogen. The remaining 2–5% typically is comprised of carbon carryover and hydrocarbons. The conversion efficiencies for the carbon carryover and adsorbed hydrocarbons, once they have been mixed with a slurry, are typically similar to the conversion efficiencies for the original organic feedstock. Thus, assuming a 95% conversion efficiency, after one pass through a high temperature plasma waste treatment system, 95% of the original organic feed stock is converted to carbon monoxide and hydrogen. Feeding the carbon carryover and hydrocarbons in a slurry back through the system then improves the total conversion to 99.75% (95%+(95%×5%)). A third pass through the system further improves the total conversion to 99.9875% (95%+(95%×5%)+(95%×0.0025%)). As will be recognized by those having skill in the art, the end result of this geometric progression results in essentially 100% conversion of the carbon carryover and hydrocarbons into a synthesis gas after several cycles. As practiced by the present invention, continuous operation of the high temperature plasma waste treatment system, coupled with the repeated feeding of the carbon carryover and adsorbed hydrocarbons back through the high temperature treatment system as a slurry, results in essentially complete destruction of both the carbon carryover and the hydrocarbons, and complete conversion of the organic feedstock into synthesis gas.

OBJECTS

Accordingly, it is an object of the present invention to provide a method for economically converting carbon carryover and hydrocarbons produced in high temperature plasma waste treatment systems into carbon monoxide and hydrogen.

It is a further object of the present invention to achieve conversion of carbon carryover into a synthesis gas by mixing the carbon carryover with a wetting agent to form a slurry, and feeding this slurry back into the high temperature plasma waste treatment system to cause a reforming reaction to convert the slurry into synthesis gas.

It is a further object of the present invention to achieve the improved conversion of hydrocarbons produced in high temperature plasma waste treatment systems into carbon monoxide and hydrogen by adsorbing the hydrocarbons onto the carbon carryover, mixing the carbon carryover with a wetting agent to form a slurry, and feeding this slurry back through the high temperature plasma waste treatment system.

It is a further object of the present invention to adsorb the hydrocarbons onto the carbon carryover by first capturing the carbon carryover onto a filter placed in the gas pathway of a high temperature plasma waste treatment system.

It is a further object of the present invention to achieve the adsorption of hydrocarbons onto carbon carryover, by cooling the off gas of the high temperature treatment system to a temperature low enough the adsorb hydrocarbons onto carbon carryover, but sufficiently high to prevent the condensation of steam.

It is a further object of the present invention to cool the off gas of the high temperature treatment system to a temperature low enough the adsorb hydrocarbons onto carbon carryover, but sufficiently high to prevent the condensation of steam, by directing the off gas through a quench prior to directing the off gas through a filter.

DESCRIPTION OF THE PREFERRED EMBODIMENT(S)

Figure 1:
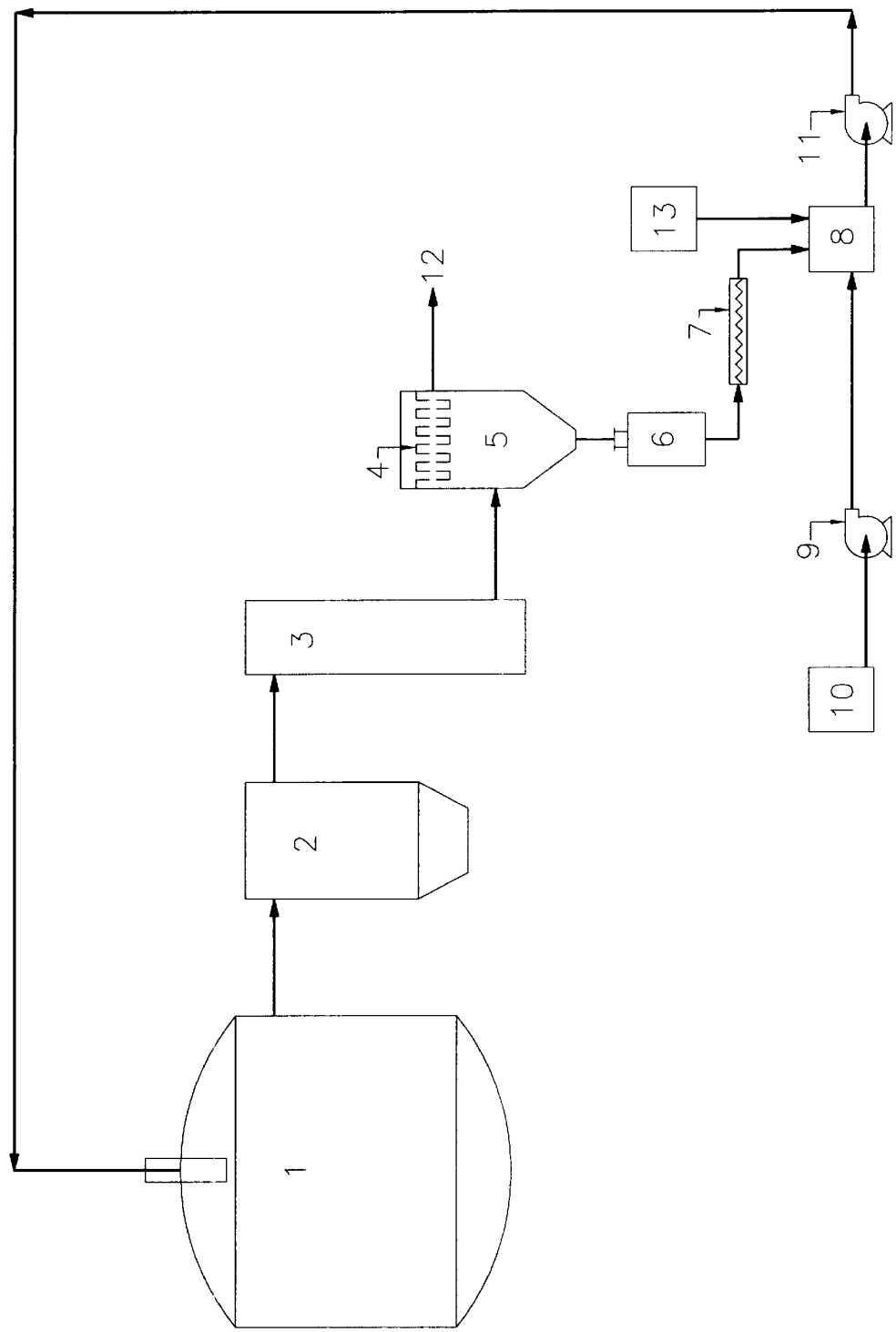
FIG. 1. is schematic drawing of the unit operations carried out in a preferred embodiment of the present invention.

As shown in FIG. 1 a first preferred embodiment of the present invention consists of several unit operations. Partial or completely organic waste streams are first fed into a high temperature plasma waste treatment processing chamber 1. Gases and carbon carryover formed by the high temperatures of the plasma within the processing chamber 1 then exit the system and are directed to a thermal residence chamber, 2, which allows them additional time at elevated temperature to complete synthesis gas forming reactions. The gasses and carbon carryover are then directed to a quench unit 3, where they are cooled to a temperature at which organic gasses will absorb onto the carbon carryover, but steam will not condense. Preferably, these gasses are thus cooled to a temperature of between 175° C. and 250° C. The carbon carryover and gasses are then directed through filters 4 within a baghouse 5.

A layer of carbon carryover will form to completely cover the filters 4 within the baghouse 5, which in turn will then adsorb any hydrocarbons flowing through the baghouse 5. When operated within the preferred temperature range of between 175° C. and 250° C., substantially all (>99%) of the organic gasses (excluding carbon dioxide and carbon monoxide) are adhered to the carbon carryover. Additional gasses, such as sulfur oxides, nitrogen and nitrogen oxides, also pass through the filter 4 within the baghouse 5. Together with synthesis gas, these gasses leave the baghouse 5 as shown by arrow 12. Depending on the particular intended use of the off gas, these additional gasses may be scrubbed from the synthesis gas down stream of the baghouse 5 by a variety of devices and methods known and understood by those having skill in the art (not shown). By periodically blowing a back pressure in the opposite direction of the off gas flow through the filters 4 within the baghouse 5, the carbon carryover and adsorbed hydrocarbons are released from the filters 4, and gathered at the bottom of baghouse 5 in a solids reciept container 6. The carbon carryover is then transported with an auger, conveyor, or other mechanism 7 to slurry tank 8. Wetting agents, held in a tank 10 are then fed by pump 9 to slurry tank 8 to form a slurry with the carbon carryover. As described in the Summary of the Invention herein, additional water may then be added from tank 13 to form the optimum mixture. The Slurry is then directed back into the processing chamber 1 with pump 11 for further processing.

While a preferred embodiment of the present invention has been shown and described, it will be apparent to those skilled in the art that many changes and modifications may be made without departing from the invention in its broader aspects. For example, as will be apparent to those having skill in the art, the present invention may be readily modified by placing two high temperature filters in parallel, thereby allowing continuous operation during the replacement or cleaning of the filter trap. Further, the present invention is useful in applications where other gasses are present in the off gas system of a high temperature plasma waste treatment system. For example, the present invention is useful for removing hydrocarbons and carbon carryover in systems which also have acid gasses present in the off gas system which are also removed by other unit operations known to those having skill in the art. Also, the present invention is useful in systems which process organic materials which are mixed with inorganic materials, such as radionuclides, metals, and glass forming constituents. As such, the scope of the present invention should in no way be limited to processes limited solely to the treatment of organic materials, and instead should be broadly construed to encompass any treatment process wherein organic materials are a part of the feed stock which produce carbon carryover and hydrocarbons. The appended claims are therefore intended to cover all such changes and modifications as fall within the true spirit and scope of the invention.

What is claimed is:

1. A method for treating carbon carryover in an effluent gas of a high temperature plasma waste treatment system, comprising the steps of:

a. introducing an organic material into a processing chamber of a high temperature plasma waste treatment system thereby converting the organic material into a gaseous effluent containing carbon monoxide, hydrogen, hydrocarbons, and carbon carryover, b. directing the gaseous effluent through a filter, thereby adhering the carbon carryover on the filter, c. removing the carbon carryover from the filter, mixing the carbon carryover with a wetting agent selected from the group consisting of methanol, ethyl alcohol, propyl alcohol, butyl alcohol, pentyl alcohol, hexyl alcohol, heptyl alcohol, octyl alcohol, decyl alcohol, dodecyl alcohol, formic acid, acetic acid, propionic acid, butyric acid, valeric acid, caproic acid, caprylic acid, capric acid, linoleic acid, linolienic acid, and combinations thereof to form a slurry, and e. directing the slurry back into the processing chamber of the high temperature plasma waste processing system.

2. A method for treating carbon carryover in an effluent gas of a high temperature plasma waste treatment system, comprising the steps of:

a. introducing an organic material into a processing chamber of a high temperature plasma waste treatment system thereby converting the organic material into a gaseous effluent containing carbon monoxide, hydrogen, hydrocarbons, and carbon carryover, b. directing the gaseous effluent through a filter, thereby adhering the carbon carryover on the filter, c. removing the carbon carryover from the filter, mixing the carbon carryover with a wetting agent selected from the group consisting of methanol, ethyl alcohol, propyl alcohol, butyl alcohol, pentyl alcohol, hexyl alcohol, heptyl alcohol, octyl alcohol, decyl alcohol, dodecyl alcohol, formic acid, acetic acid, propionic acid, butyric acid, valeric acid, caproic acid, caprylic acid, capric acid, linoleic acid, linolienic acid, and combinations thereof in a mixture with water to form a slurry, and d. directing the slurry back into the processing chamber of the high temperature plasma waste processing system.

* * * * *